(12) United States Patent
Miyoshi et al.

(10) Patent No.: US 12,005,965 B2
(45) Date of Patent: Jun. 11, 2024

(54) BODY STRUCTURE FOR VEHICLE

(71) Applicant: MAZDA MOTOR CORPORATION, Hiroshima (JP)

(72) Inventors: Yuji Miyoshi, Hiroshima (JP); Kohya Nakagawa, Hiroshima (JP); Tomoya Yoshida, Hiroshima (JP); Koki Kagimoto, Hiroshima (JP); Shinichi Ohshima, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 142 days.

(21) Appl. No.: 17/784,020

(22) PCT Filed: Nov. 24, 2020

(86) PCT No.: PCT/JP2020/043632
§ 371 (c)(1),
(2) Date: Jun. 9, 2022

(87) PCT Pub. No.: WO2021/124808
PCT Pub. Date: Jun. 24, 2021

(65) Prior Publication Data
US 2023/0022738 A1  Jan. 26, 2023

(30) Foreign Application Priority Data
Dec. 20, 2019 (JP) .................. 2019-230375

(51) Int. Cl.
*B62D 27/00* (2006.01)
*B62D 25/02* (2006.01)
(Continued)

(52) U.S. Cl.
CPC ......... *B62D 27/026* (2013.01); *B62D 25/025* (2013.01); *F16F 15/00* (2013.01)

(58) Field of Classification Search
CPC .. B62D 25/04; B62D 25/025; B62D 25/2009; B62D 27/023; B62D 27/026; F16F 15/00; F16F 15/02; F16F 15/04
(Continued)

(56) References Cited

U.S. PATENT DOCUMENTS 6,482,496 B1 * 11/2002 Wycech ................. B29C 44/12
428/185
10,150,511 B2 * 12/2018 Iyoshi .................... B62D 25/04
(Continued)

FOREIGN PATENT DOCUMENTS

JP   2006-213262 A   8/2006
JP   2012-206703 A   10/2012
(Continued)

OTHER PUBLICATIONS

International Search Report issued in PCT/JP2020/043632; mailed Feb. 9, 2021.
(Continued)

*Primary Examiner* — Dennis H Pedder
(74) *Attorney, Agent, or Firm* — Studebaker & Brackett PC

(57) ABSTRACT

The present disclosure provides a body structure for a vehicle capable of improving a vibration damping effect by a damping member while preventing an increase in an application amount of the damping member and a shape change of a component. Embodiments include a body structure for a vehicle in which a first bonded surface of a first body component and a second bonded surface of a second body component are bonded via a damping member, with which a portion between the first bonded surface and the second bonded surface is filled. The first bonded surface of the first body component has a vertical wall extending toward the second bonded surface or away from the second (Continued)

bonded surface. The portion between the first bonded surface and the second bonded surface is filled with the damping member such that the damping member contacts the vertical wall.

10 Claims, 15 Drawing Sheets

(51) Int. Cl.
*B62D 27/02* (2006.01)
*F16F 15/00* (2006.01)

(58) Field of Classification Search
USPC .............. 296/204, 193.06, 187.02, 1.03, 29
See application file for complete search history.

(56) References Cited

U.S. PATENT DOCUMENTS

2013/0049405 A1    2/2013    Kurogi et al.

2015/0284034 A1   10/2015   Blank et al.
2016/0229456 A1    8/2016   Boettcher et al.
2017/0011730 A1    1/2017   Seto et al.

FOREIGN PATENT DOCUMENTS

| JP | 2013-049376 A | 3/2013 |
| JP | 2019-055669 A | 4/2019 |
| JP | 2019-098908 A | 6/2019 |
| WO | 2015/115647 A1 | 8/2015 |

OTHER PUBLICATIONS

The extended European search report issued by the European Patent Office on Nov. 27, 2023, which corresponds to European Patent Application No. 20902571.7-1009 and is related to U.S. Appl. No. 17/784,020.

* cited by examiner

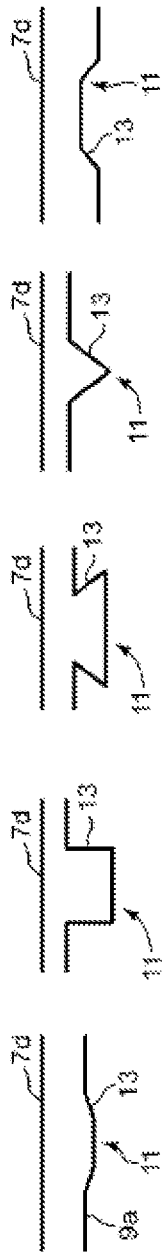

BODY STRUCTURE FOR VEHICLE

TECHNICAL FIELD

The present disclosure relates to a body structure for a vehicle.

BACKGROUND

Conventionally, a body structure for a vehicle such as an automobile has been known wherein, to dampen vibration generated during travel of the vehicle, a damping member such as a damping adhesive is interposed between overlapping portions of body components.

For example, in a body structure disclosed in JP-A-2013-049376, a joint member is arranged inside a closed-cross sectional portion of a frame constituting a body such that, when being fixed to a part of an inner circumferential surface of the closed cross-sectional portion by welding or the like, the joint member is made to overlap and is bonded to another portion of the inner circumferential surface via the damping adhesive.

In the body structure that dampens vibration via the damping member as described above, in order to improve a vibration damping effect, it is possible to thicken the damping member or to increase a rigidity difference between the body components that hold the damping member.

However, this is a problem because the cost of the damping member is increased by increasing the weight of the damping member. In addition, there is a concern that the increase in rigidity difference between the body components affects performance other than vibration damping in the body; for example, collision and strength reliability or the like, and requires significant shape changes of the components.

SUMMARY

The present disclosure has a purpose of providing a body structure for a vehicle capable of improving a vibration damping effect by a damping member while preventing an increase in an application amount of the damping member and a shape change of a component.

In order to solve the above problem, a body structure for a vehicle of the present disclosure includes a first body component having a first bonded surface; and a second body component having a second bonded surface opposing the first bonded surface. The first bonded surface and the second bonded surface are bonded via a damping member with which a portion between the first bonded surface and the second bonded surface is filled. The first bonded surface is formed with a vertical wall extending toward the second bonded surface or away from the second bonded surface. The portion between the first bonded surface and the second bonded surface is filled with the damping member such that the damping member contacts the vertical wall.

BRIEF DESCRIPTION OF THE DRAWINGS

FIG. 11A to FIG. 11L are views illustrating applicable shapes as the projected section in FIG. 3.

DETAILED DESCRIPTION

A detailed description will hereinafter be made on a preferred embodiment of the present disclosure with reference to the accompanying drawings.

Figure 1:
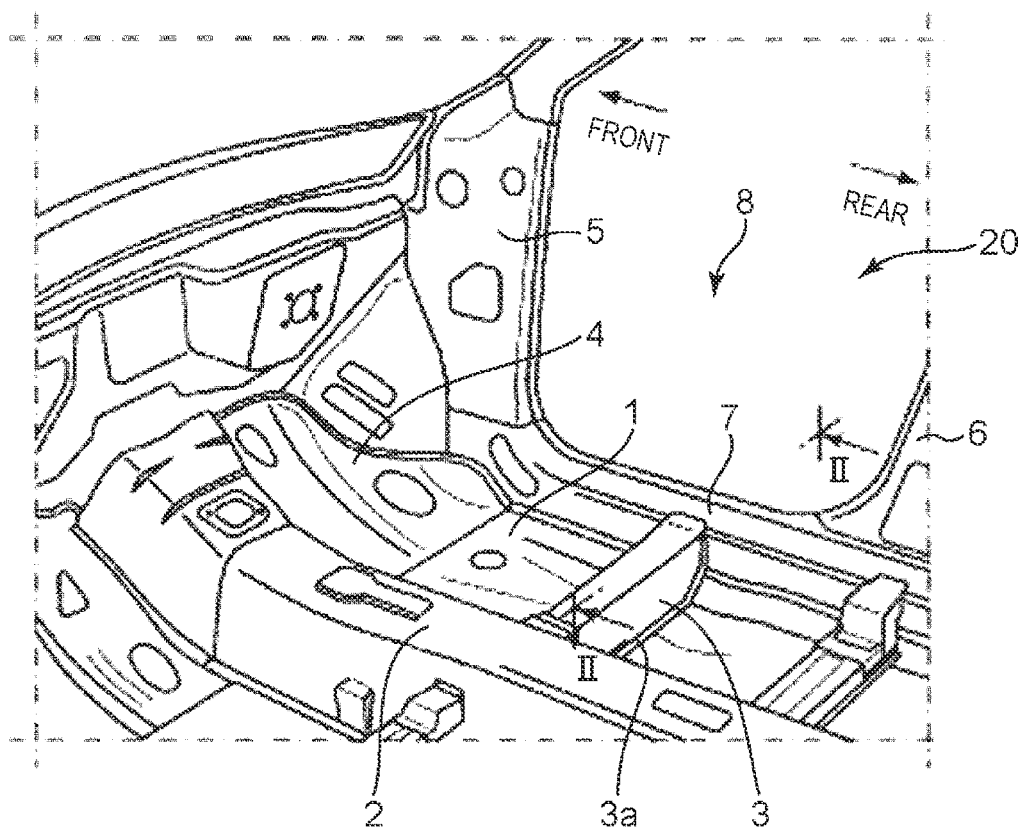
FIG. 1 is a perspective view of a cabin front portion to which a body structure for a vehicle according to an embodiment of the present disclosure is applied.

A body structure 20 for a vehicle illustrated in FIG. 1 is constructed of plural body components and, more specifically, includes: a floor panel 1 that constitutes a bottom surface of a cabin; a tunnel reinforcement member 2 that extends in a vehicle longitudinal direction at a center of the cabin; a cross reinforcement member 3 that extends in a vehicle width direction; a toe board 4 that is arranged in front of the floor panel 1; a front pillar 5 that extends in a vertical direction on each of the sides at a front end of the cabin; a center pillar 6 that extends in the vertical direction on each side at a center of the cabin; and a side sill 7 that extends in the vehicle longitudinal direction on both of the sides in a lower portion of the cabin. The cross reinforcement member 3 couples the tunnel reinforcement member 2 and the side sill 7 and thereby increases rigidity of a lower portion of a body. On each of the sides of the cabin, the front pillar 5, the center pillar 6, the side sill 7, and a roof rail 15 (see FIG. 13) that extends in the vehicle longitudinal direction at a position above the side sill 7 form a front-side opening 8 in a substantially rectangular shape.

Figure 2:
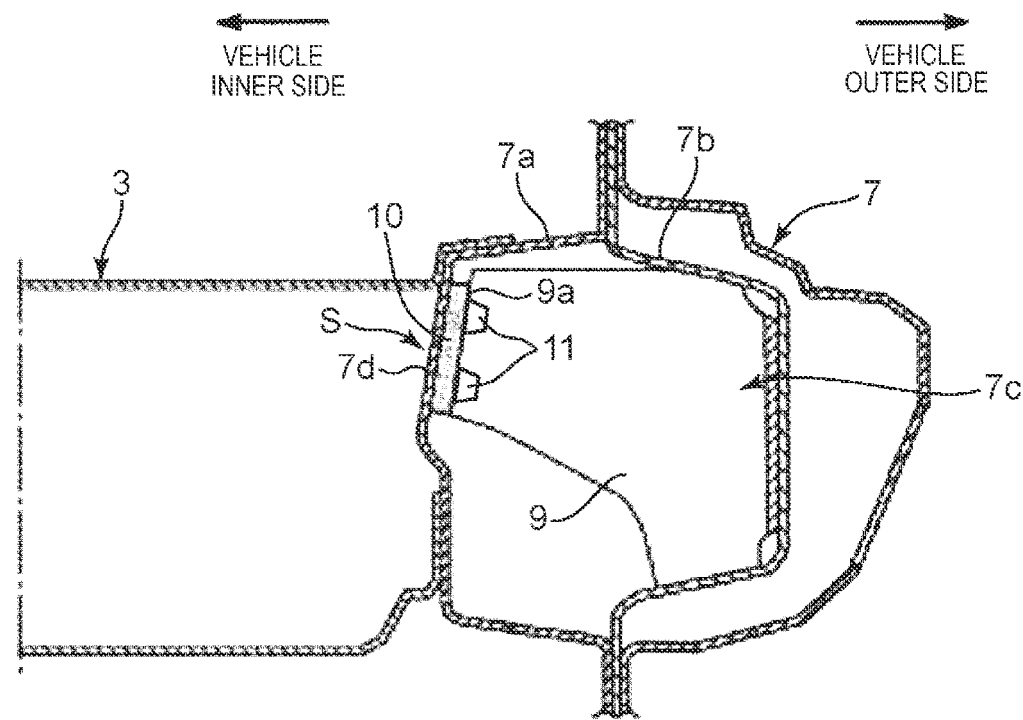
FIG. 2 is a cross-sectional view that is taken along line II-II in FIG. 1.

As illustrated in FIG. 2, in this embodiment, a description will made by focusing on a bonded portion between the side sill 7 and a joint member 9 inserted therein as an example of a first body component and a second body component that are bonded via a damping adhesive 10 (damping member).

More specifically, the joint member 9 as the first body component of the present disclosure has a flat surface section 9a that constitutes a first bonded surface. Meanwhile, the side sill 7 as the second body component of the present disclosure is a hollow cylindrical member and has a vertical surface 7d that constitutes a second bonded surface.

More specifically, the side sill 7 is constructed of an inner side sill 7a on a cabin inner side ("VEHICLE INNER SIDE" in FIG. 2) and an outer side sill 7b on a cabin outer side ("VEHICLE OUTER SIDE" in FIG. 2). Inside a space section 7c of the side sill 7, the joint member 9 is arranged in a manner to partition the space section 7c of the side sill 7 in the vehicle longitudinal direction. The flat surface section 9a of the joint member 9 opposes the vertical surface 7d of the inner side sill 7a.

The joint member 9 is fixed to an inner surface of the outer side sill 7b by welding or the like. Meanwhile, the joint member 9 is bonded to an inner surface of the inner side sill 7a via the damping adhesive 10 as the damping member. Accordingly, it is possible to improve rigidity of the hollow side sill 7 by the joint member 9 and to dampen vibration, which is transmitted between the outer side sill 7b and the inner side sill 7a through the joint member 9, by the damping adhesive 10.

The configuration illustrated in FIG. 2 is a configuration that the vertical surface 7d of the side sill 7 and the flat surface section 9a of the joint member 9 are made to overlap and bonded to each other via the damping adhesive 10. Thus, these vertical surface 7d of the side sill 7 and flat surface section 9a of the joint member 9 constitute an overlapping surface S.

Figure 3:
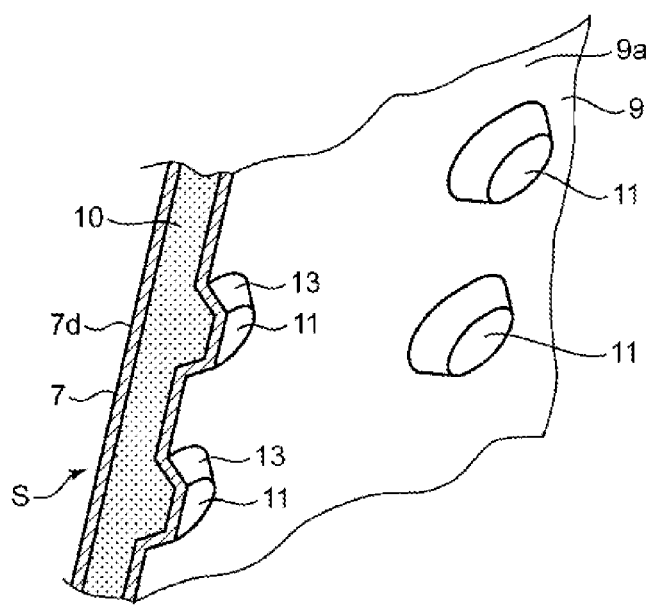
FIG. 3 is an enlarged cross-sectional view of an area near a projected section of an overlapping portion between a joint member and an inner side sill in FIG. 2.
Figure 4:
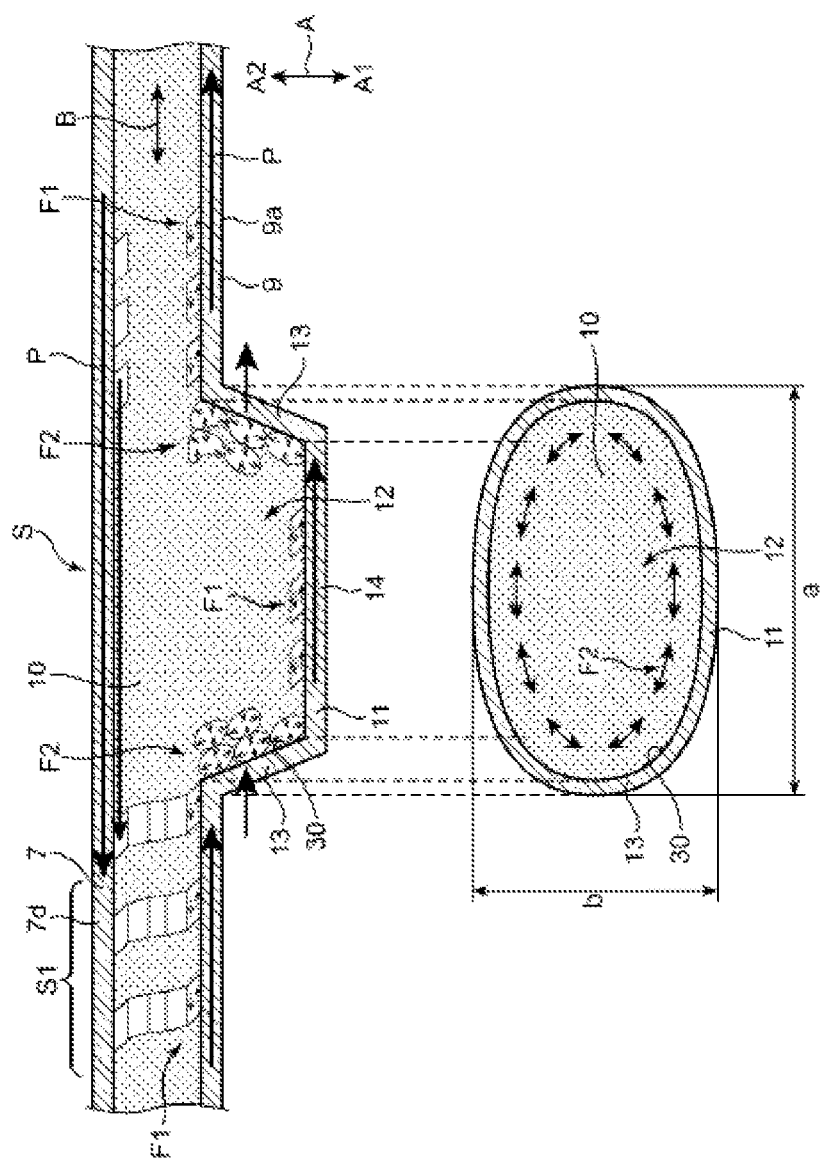
FIG. 4A is a cross-sectional explanatory view for explaining a shearing strain and a compression strain of a damping member that are generated between overlapping surfaces of the joint member and the inner side sill in FIG. 2 and inside a recessed section in the projected section.
FIG. 4B is a cross-sectional explanatory view illustrating the compression strain in an inner circumferential surface of the oval-shaped recessed section when seen in a normal direction of a flat surface section of the joint member.

In this embodiment, as illustrated in FIGS. 2 to 4, the joint member 9 as the first body component has the flat surface section 9a as a plate-shaped member. The flat surface section 9a has a surface on one side (a surface opposing the vertical surface 7d) as the first bonded surface, and the flat surface section 9a is formed with a projected section 11, a surface of which on one side is recessed and a surface of which on the other side is projected, by pressing or the like. By this projected section 11, a recessed section 12 is formed on the first bonded surface.

As a result, as illustrated in FIG. 4A and FIG. 4B, the flat surface section 9a (first bonded surface) is configured to have the recessed section 12 that is recessed in a direction A1 separating from the vertical surface 7d (second bonded surface). In addition, an inner circumferential surface 30 that continues in a circumferential direction of the recessed section 12 constitutes the vertical wall in the present disclosure. The recessed section 12 is filled with the damping adhesive 10, which thus contacts the inner circumferential surface 30.

A further detailed description will be made of the projected section 11, and the projected section 11 includes a circumferential wall 13 and a top wall 14 that closes an opening edge of the circumferential wall 13. The circumferential wall 13 has a closed shape (substantially annular shape in FIG. 4B), and has the same thickness for the entire circumference. As illustrated in FIG. 4A and FIG. 4B, the recessed section 12 of the projected section 11 is filled with the damping adhesive 10, which then contacts the inner circumferential surface 30 of the recessed section 12 (that is, an inner circumferential surface of the circumferential wall 13). The inner circumferential surface 30 as the vertical wall of the recessed section 12 is in contact with the damping adhesive 10 in an in-plane direction B that intersects a normal direction A of the flat surface section 9a.

Here, as illustrated in FIG. 4A, such a case is considered that, in the overlapping surface S between the vertical surface 7d (second bonded surface) of the side sill 7 and the flat surface section 9a (first bonded surface) of the joint member 9, the vertical surface 7d and the flat surface section 9a are displaced relative to each other in the in-plane direction B due to the vibration during travel of a vehicle.

In this case, in a flat portion S1 of the overlapping surface S, the damping adhesive 10 is only applied with a shearing force F1 in the in-plane direction B by a pressure P in the in-plane direction B of the flat surface section 9a, which then generates a shearing strain.

In this embodiment, in the flat surface section 9a of the joint member 9, the inner circumferential surface 30 as the vertical wall of the recessed section 12 is formed by disposing the projected section 11. By the circumferential wall 13 having this inner circumferential surface 30, the damping adhesive 10 is applied with a compressive force F2 (or a tensile force) in the in-plane direction B, which generates a compression strain. As a result, together with the shearing strain, the compression strain is also generated to the damping adhesive 10 by the relative displacement of the vertical surface 7d and the flat surface section 9a. Thus, a total amount of strain energy absorbed by the damping adhesive 10 is increased.

In addition, as illustrated in FIG. 4B, in the case where the inner circumferential surface 30 of the recessed section 12 on the inner side of the circumferential wall 13, which is closed in the substantially annular shape, is seen in the normal direction A of the flat surface section 9a, the damping adhesive 10 is continuously applied with the compressive force F2 (or the tensile force) along the inner circumferential surface 30, which continuously generates the compression strain. As a result, the strain energy generated by the compression strain is increased, and the strain energy absorbed by the damping adhesive 10 is further increased.

As illustrated in FIG. 4B, the recessed section 12 and the projected section 11 provided therewith preferably have a shape, an aspect ratio b/a of which falls within a range of 0.5 to 2.0 when seen in the normal direction A (here, since the circumferential wall 13 of the projected section 11 has the same thickness for the entire circumference, the aspect ratio of the projected section 11 has a corresponding relationship with the aspect ratio of the recessed section 12). Since a shape in which vertical and lateral lengths of the recessed section 12 are substantially equal can be obtained in this range, it is possible to increase the compression strain of the damping adhesive 10 while suppressing deformation of the inner circumferential surface 30 as the vertical wall of the recessed section 12 (more specifically, the circumferential wall 13 constituting the inner circumferential surface 30).

Figure 5:
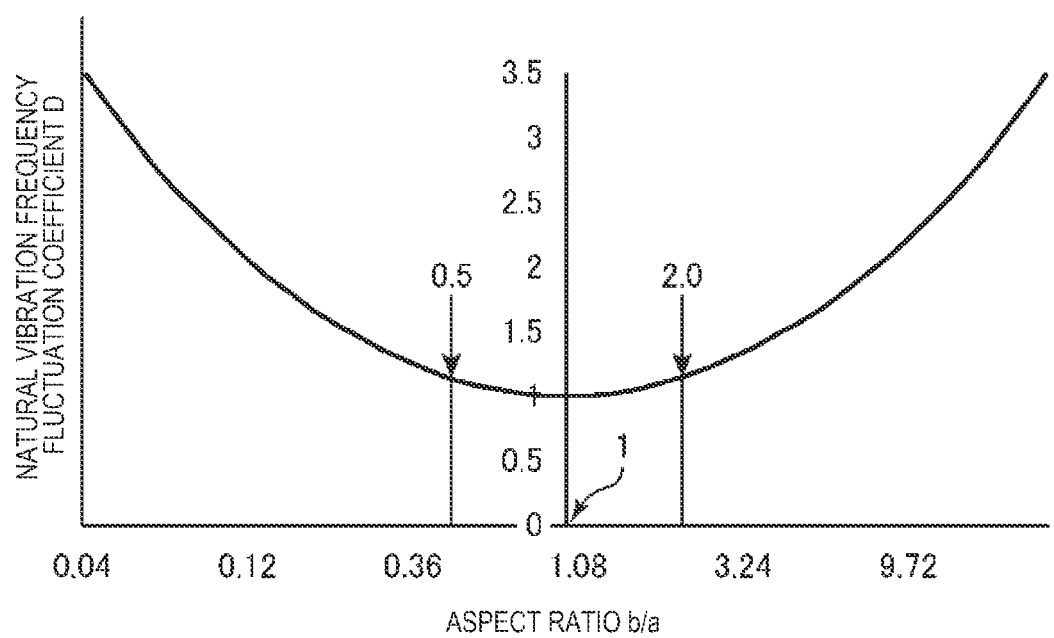
FIG. 5 is a graph illustrating a relationship between an aspect ratio of the projected section having the recessed section in FIG. 4b and a natural vibration frequency fluctuation coefficient.

When a graph illustrated in FIG. 5 is seen, in a relationship between the aspect ratio b/a of the recessed section 12 in FIG. 4B and the projected section 11 provided therewith and a natural vibration frequency fluctuation coefficient D, the natural vibration frequency fluctuation coefficient D becomes 1 as the lowest with the aspect ratio b/a of 1 (that is, becomes an inflection point with the aspect ratio b/a of 1 in a curve illustrated in FIG. 5), and the natural vibration frequency fluctuation coefficient D is increased as the aspect ratio b/a becomes higher than 1 or lower than 1. As this natural vibration frequency fluctuation coefficient D is increased, the projected section 11 is more likely to be deformed.

Figure 6A:
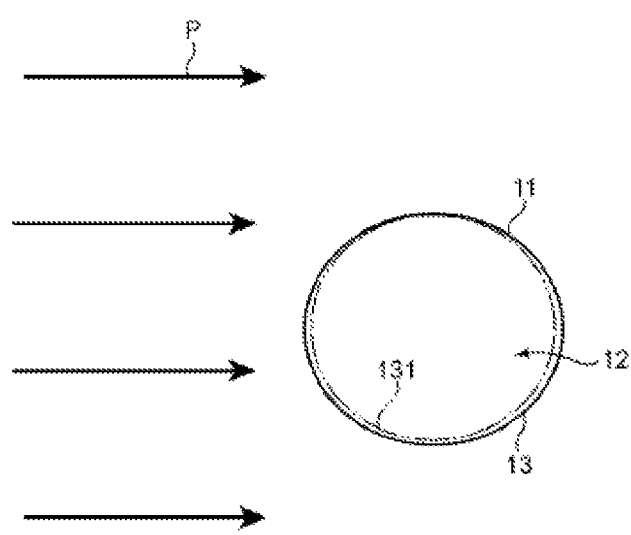
FIG. 6A is a view illustrating deformation of a circumferential wall when the projected section in FIG. 3 has a circular shape, and is a view in which the deformation of the circumferential wall is seen in the normal direction of the flat surface section of the joint member.
Figure 6B:
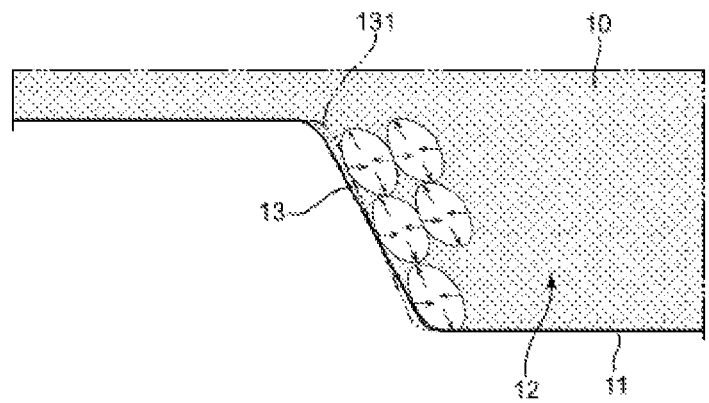
FIG. 6B is a view in which the deformation of the circumferential wall corresponding to FIG. 6A is seen in a vertical cross section near the projected section.

For example, as illustrated in FIG. 6A and FIG. 6B, in the case where an outer shape of the projected section 11 that is seen in the normal direction A of the flat surface section 9a (that is, the shape of the circumferential wall 13) is circular (that is, the aspect ratio b/a=1), and the damping adhesive 10 receives the pressure P in the in-plane direction B from the vertical surface 7d and the flat surface section 9a, opening deformation from a circumferential wall 131 in an initial state (that is, deformation in an outward direction of the projected section 11) hardly occurs, and the circumferential wall 13 is not deflected outward. For such a reason, the compression strain of the damping adhesive 10 around the circumferential wall 13 is not dispersed but accumulated. As a result, the strain energy absorbed by the damping adhesive 10 can be increased, and a vibration damping effect can be improved.

Figure 7A:
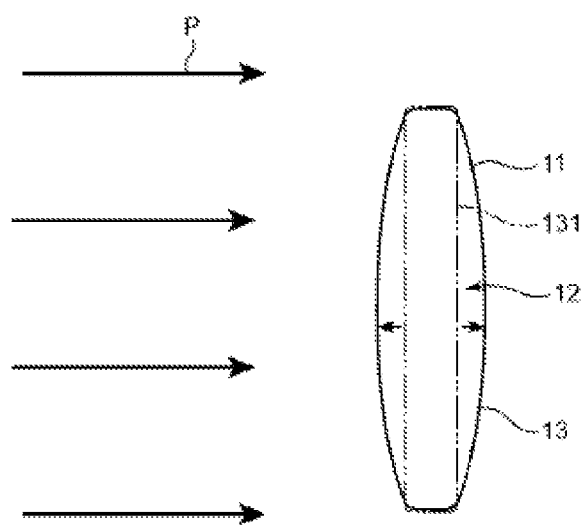
FIG. 7A is a view illustrating deformation of the circumferential wall when the projected section in FIG. 3 has a narrow rectangular shape, and is a view in which the deformation of the circumferential wall is seen in the normal direction of the flat surface section of the joint member.
Figure 7B:
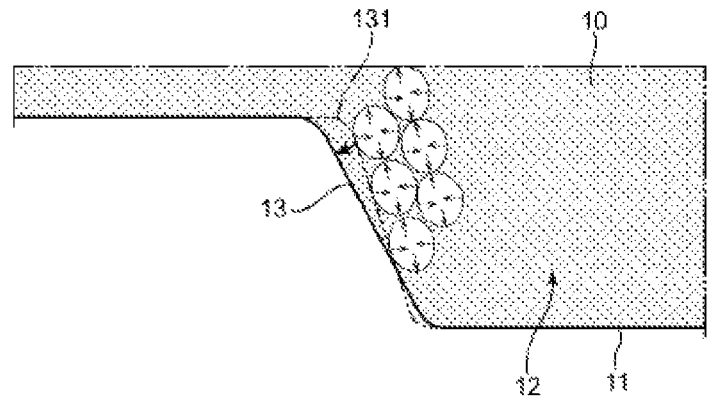
FIG. 7B is a view in which the deformation of the circumferential wall corresponding to FIG. 7A is seen in the vertical cross section near the projected section.

On the other hand, as illustrated in FIG. 7A and FIG. 7B, in the case where the shape of the projected section 11 that is seen in the normal direction A of the flat surface section 9a (that is, the shape of the circumferential wall 13) is an elongated rectangle (the aspect ratio b/a>>2), the opening deformation from the circumferential wall 131 in the initial state is significant, and the circumferential wall 13 is deflected outward significantly. For such a reason, the compression strain of the damping adhesive 10 around the circumferential wall 13 is dispersed and not accumulated. As a result, the strain energy absorbed by the damping adhesive 10 is reduced, and it is difficult to exert the vibration damping effect.

Figure 8A:
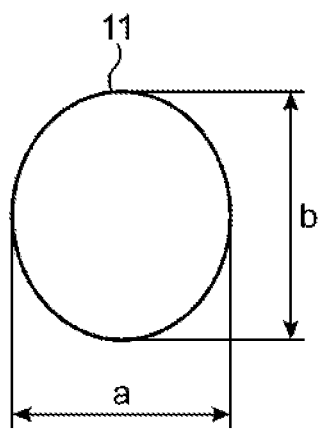
FIG. 8A is a view illustrating a shape of the projected section when the projected section in FIG. 3 is seen in the normal direction of the flat surface section, and is a view illustrating a substantially circular shape.
Figure 8B:
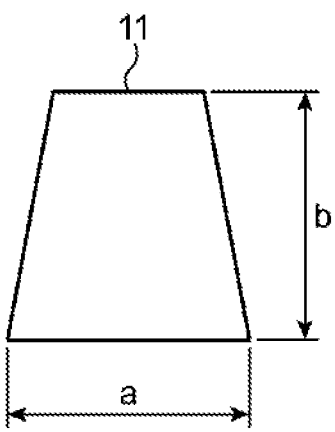
FIG. 8B is a view illustrating a trapezoid as another shape of the projected section.
Figure 8C:
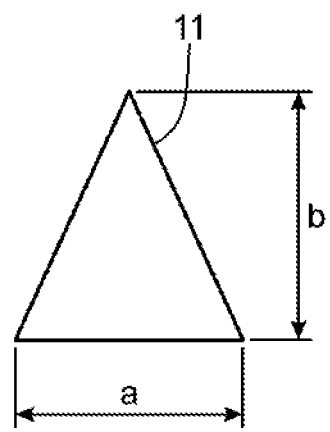
FIG. 8C is a view illustrating a triangular shape as further another shape of the projected section.

In addition, as illustrated in FIGS. 8A-8C, in the case where the projected section 11 has one of the circular, triangular, or quadrilateral shapes when seen in the normal direction A of the flat surface section 9a, such a shape can easily be formed by pressing or the like. In particular, in the case where the projected section 11 has the circular shape when seen in the normal direction A, vertical and lateral lengths of the projected section 11 are equal to each other, and an effect of increasing the compression strain of the damping adhesive 10 while suppressing the deformation of the circumferential wall 13 becomes the highest. Thus, such a shape is most preferred.

From a perspective of increasing the strain energy absorbed by the damping adhesive 10, the circumferential wall 13 having the inner circumferential surface 30 as the vertical wall is preferably inclined at an angle of 16 to 100 degrees with respect to the flat surface section 9a of the joint member 9.

Figure 9:
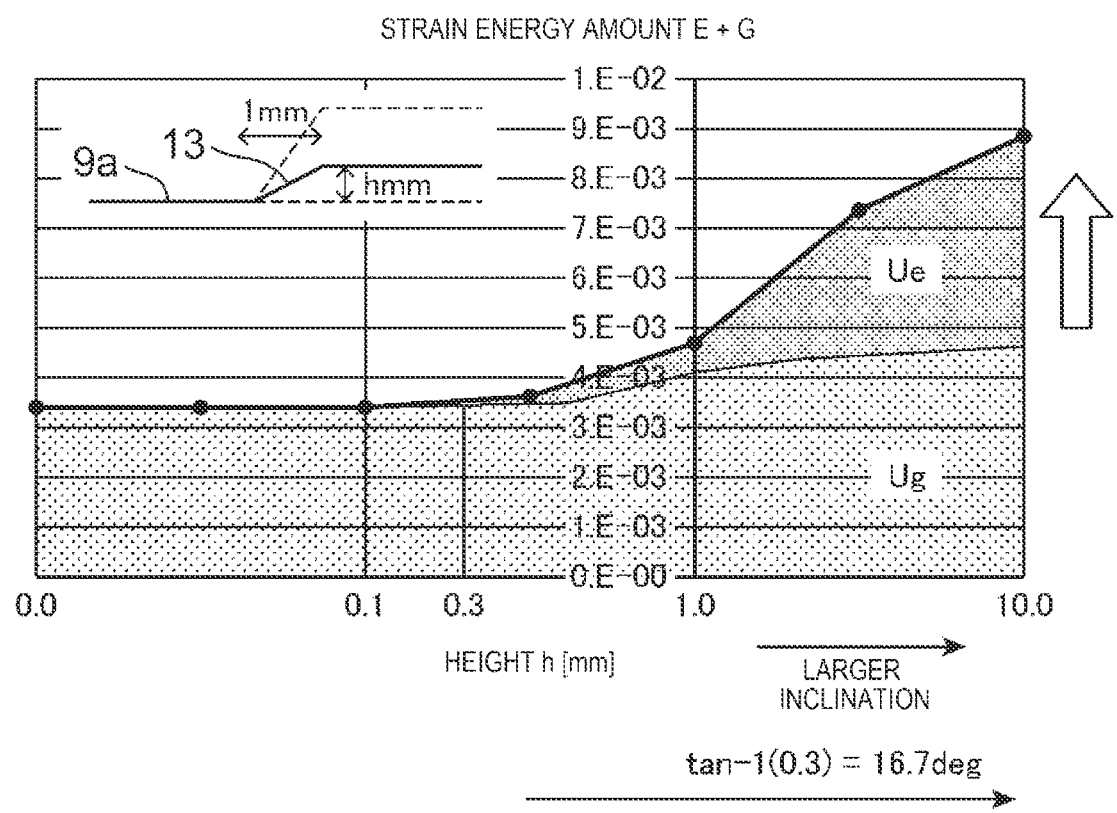
FIG. 9 is a graph illustrating a relationship between a height per mm width of the circumferential wall of the projected section in FIG. 3 and a total amount of strain energy generated by the shearing strain and the compression strain of the damping member.

Here, from a graph illustrated in FIG. 9, a relationship between a height h per mm width of the circumferential wall 13 of the projected section 11 in FIG. 3 and a total amount E+G of the strain energy generated by the shearing strain and the compression strain of the damping adhesive 10 is observed.

As it is apparent from the graph in FIG. 9, it is understood that strain energy Ug generated by the shearing strain of the damping adhesive 10 is hardly changed with 0 to 0.3 mm of the height h per mm width of the circumferential wall 13 and is slightly increased with 0.3 to 1.0 mm of the height h per mm width of the circumferential wall 13.

Meanwhile, it is understood that strain energy Ue generated by the compression strain of the damping adhesive 10 is hardly changed when the height h per mm width of the circumferential wall 13 is 0 to a slightly lower height than 0.3 mm, is slightly increased from the height h per mm width of the circumferential wall 13 being the slightly lower height than 0.3 mm, and is further rapidly increased when the height h per mm width of the circumferential wall 13 is 0.3 to 1.0 mm.

When seen a total amount Ug+Ue of the strain energy illustrated in FIG. 9, it is understood that the total amount Ug+Ue of the strain energy is increased when the height h per mm width of the circumferential wall 13 is the slightly lower height than 0.3 mm or higher.

Here, in the case where it is considered that an inclination angle of the circumferential wall 13 is tan−1(0.3)=16.7 degrees when the height h per mm width of the circumferential wall 13 is 0.3 mm, and the circumferential wall 13 is inclined at 16 degrees or more with respect to the flat surface section 9a of the joint member 9, the strain energy absorbed by the damping adhesive 10 can be increased. Meanwhile, when processing limitation in such a case is considered that the circumferential wall 13 as the vertical wall is formed by using a metal sheet such as steel and by pressing or the like, the angle of the circumferential wall 13 with respect to the flat surface section 9a preferably falls within 100 degrees. Accordingly, from conditions of increasing the strain energy and of the processing limitation, it is derived that the circumferential wall 13 is preferably inclined at 16 to 100 degrees with respect to the flat surface section 9a.

Figure 10:
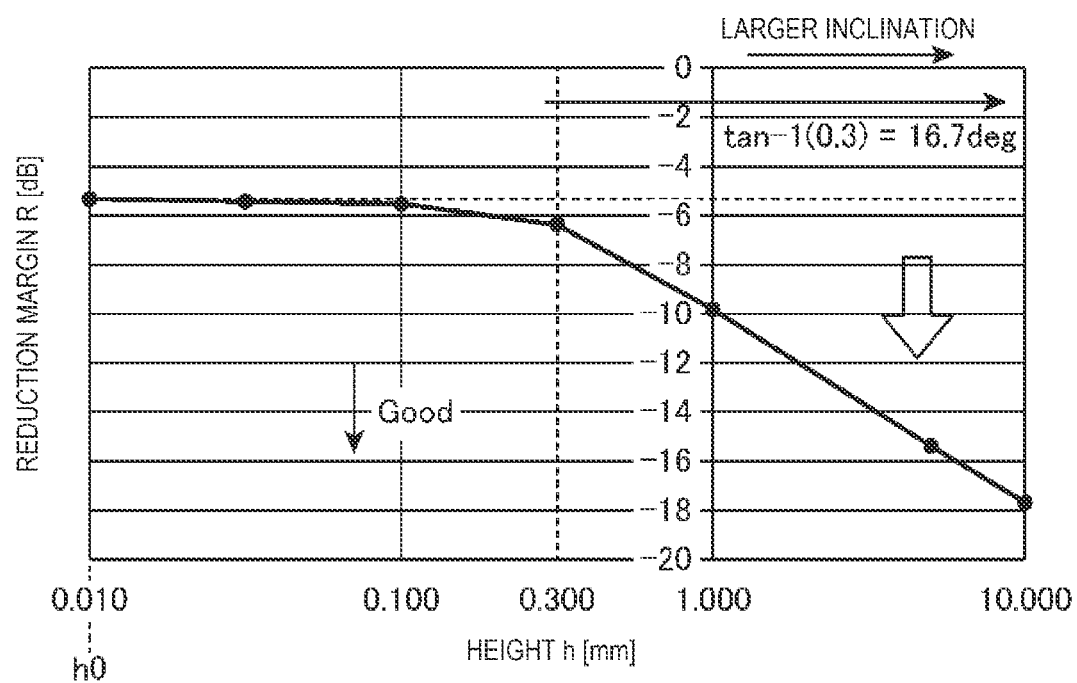
FIG. 10 is a graph illustrating a relationship between the height per mm width of the circumferential wall of the projected section in FIG. 3 and a reduction margin of vibration by the damping member.

Next, from a graph illustrated in FIG. 10, a relationship between the height h per mm width of the circumferential wall 13 of the projected section 11 and a vibration reduction margin R (dB) by the damping adhesive 10 is observed. It is understood from the graph in FIG. 10 that the vibration reduction margin R (dB) by the damping adhesive 10 is hardly reduced when the height h per mm width of the circumferential wall 13 is 0 to the slightly lower height than 0.3 mm, that a degree of the reduction is slightly increased from the height h per mm width of the circumferential wall 13 being the slightly lower height than 0.3 mm, and further that the vibration reduction margin R (dB) by the damping adhesive 10 is rapidly reduced when the height h per mm width of the circumferential wall 13 is 0.3 to 1.0 mm. Accordingly, when the height h per mm width of the circumferential wall 13 is the slightly lower height than 0.3 mm or higher, the vibration reduction margin R (dB) by the damping adhesive 10 is reduced. Thus, it is evidenced that, when the circumferential wall 13 is inclined at 16 degrees or more with respect to the flat surface section 9a, the vibration damping effect can be enhanced.

Any of the various shapes can be adopted for the projected section 11 as long as the angle of the circumferential wall 13 with respect to the flat surface section 9a falls within a range of 16 to 100 degrees. Accordingly, as illustrated in FIG. 11A to FIG. 11D, the circumferential wall 13 may be inclined in a direction of defining any of an acute angle, a right angle, or an obtuse angle with respect to the flat surface section 9a in a manner to extend in a direction separating from the vertical surface 7d opposing the flat surface section 9a. Alternatively, as illustrated in FIG. 11E, the projected section 11 may be projected in a direction approaching the vertical surface 7d, and the circumferential wall 13 may be inclined in the direction approaching the vertical surface 7d. Furthermore, as illustrated in FIG. 11F to FIG. 11L, even when the circumferential wall 13 is curved and bent, as described above, the total amount of the strain energy, which generates the compression strain to the damping adhesive 10, can be increased by the circumferential wall 13. Here, as shown in FIG. 11A to FIG. 11E, a shape that is formed with a pointy corner by the circumferential wall 13 and the flat surface section 9a is preferred in a point that the compression strain of the damping adhesive 10 can be increased.

The damping adhesive 10 (damping member) is preferably viscoelastic to reliably exert the vibration damping effect. For example, such a viscoelastic damping adhesive 10 is configured to include: an adhesive such as of epoxy, urethane, or acrylic; and an additive that is added to the adhesive (for example, a curing agent, an inorganic or organic filler, a moisture-absorbent material, or the like).

The damping member is not only in the form of a paste adhesive, and the material and the form thereof are not limited as long as the damping member is viscoelastic.

In addition, in the case where the damping adhesive 10 has a loss factor of 0.2 or higher and a storage modulus of 100 MPa or higher under conditions of 20° C. and 60 Hz, the damping adhesive 10 can exert the more significant vibration damping effect than a structural adhesive. Further more preferably, in the case where the loss factor is 0.3 to 0.4 and the storage modulus is 1000 MPa or higher, the further more significant vibration damping effect can be exerted.

Characteristics of the Embodiment (1)

The body structure 20 of this embodiment is the structure that includes: the side sill 7 (second body component) that has the joint member 9 (first body component) having the flat surface section 9a (first bonded surface); and the vertical surface 7d (second bonded surface) opposing the flat surface section 9a and in which the flat surface section 9a and the vertical surface 7d are bonded via the damping adhesive 10 (damping member), with which the portion between the flat surface section 9a and the vertical surface 7d is filled. The flat surface section 9a is formed with the circumferential wall 13 that has the inner circumferential surface 30 and serves as the vertical wall extending in a direction A2 (see FIG. 4A) approaching the vertical surface 7d or the direction A1 separating from the vertical surface 7d. The portion between the flat surface section 9a and the vertical surface 7d is filled with the damping adhesive 10 such that the damping adhesive 10 contacts the inner circumferential surface 30.

In this configuration, when the side sill 7 and the joint member 9 are relatively displaced in the in-plane direction B of the flat surface section 9a that intersects the normal direction A of the flat surface section 9a by the vibration of the body during the travel of the vehicle, not only the shearing strain is generated to the damping adhesive 10 by the relative displacement of these flat surface section 9a and vertical surface 7d, but also the compression strain is simultaneously generated to the damping adhesive 10 due to the compression of the damping adhesive 10 by the inner circumferential surface 30 as the vertical wall. In this way, the total amount of the strain energy absorbed by the damping adhesive 10 is increased. The damping adhesive 10 can dampen the vibration by converting this strain energy into thermal energy. As a result, it is possible to improve the vibration damping effect by the damping adhesive 10 while suppressing an increase in an application amount of the damping adhesive 10 and the shape change of the component.

(2)

In the body structure 20 of this embodiment, the flat surface section 9a (first bonded surface) has the recessed section 12 that is recessed in the direction A1 separating from the vertical surface 7d (second bonded surface). The vertical wall is constructed of the inner circumferential surface 30 that continues in the circumferential direction of the recessed section 12. The recessed section 12 is filled with the damping adhesive 10, which thus contacts the inner circumferential surface 30.

In this configuration, in the recessed section 12, since the damping adhesive 10 is compressed against each other along the inner circumferential surface 30 as the vertical wall, the compression strain of the damping adhesive 10 can be increased, and thus the strain energy absorbed by the damping adhesive 10 can further be increased. As a result, the vibration damping effect can further be improved.

(3)

In the body structure 20 of this embodiment, the joint member 9 as the first body component has the flat surface section 9a as the plate-shaped member. The flat surface section 9a has the surface on the one side (the surface opposing the vertical surface 7d) as the first bonded surface, and the flat surface section 9a is formed with the projected section 11, the surface of which on the one side is recessed and the surface of which on the other side is projected, by pressing or the like. By this projected section 11, the recessed section 12 is formed on the first bonded surface. In this configuration, the recessed section 12 can easily be formed in the first bonded surface by pressing the flat surface section 9a as the plate-shaped member. In addition, it is also possible to form the vertical wall (that is, the inner circumferential surface 30 of the recessed section 12) having the greater height than the thickness of the plate-shaped member, the strain energy by the compression strain, which is generated to the damping adhesive 10 by the vertical wall, can be improved, and the vibration damping effect can further be improved.

(4)

In the body structure 20 of this embodiment, the recessed section 12 has such a shape that the aspect ratio b/a falls within the range of 0.5 to 2.0 when seen in the normal direction A of the flat surface section 9a (first bonded surface). In this embodiment, since the shape of the recessed section 12 is such a shape that the aspect ratio b/a falls within the range of 0.5 to 2.0 when seen in the normal direction A of the flat surface section 9a (first bonded surface), that is, such a shape that the vertical and lateral lengths of the recessed section 12 are substantially equal, it is possible to further increase the compression strain of the damping adhesive 10 while suppressing the deformation of the inner circumferential surface 30 of the recessed section 12 (more specifically, the circumferential wall 13 constituting the inner circumferential surface 30). In this way, the strain energy absorbed by the damping adhesive 10 can further be increased, and the vibration damping effect can further be improved.

(5)

In the body structure 20 of this embodiment, the recessed section 12 has the circular shape when seen in the normal direction A of the flat surface section 9a (first bonded surface). In this embodiment, since the vertical and lateral lengths of the recessed section 12 are equal, the effect of increasing the compression strain of the damping adhesive 10 while suppressing the deformation of the inner circumferential surface 30 of the recessed section 12 (more specifically, the circumferential wall 13 constituting the inner circumferential surface 30) becomes the highest.

(6)

In the body structure of this embodiment, the circumferential wall 13 that constitutes the inner circumferential surface 30 as the vertical wall is inclined at 16 to 100 degrees with respect to the flat surface section 9a. In this configuration, the further significant compression strain is generated to the damping adhesive 10 due to the significant compression of the damping adhesive 10 by the inner circumferential surface 30 as the vertical wall. Accordingly, the total amount of the strain energy absorbed by the damping adhesive 10 is further increased, and the vibration damping effect can further be improved. In addition, since the above range of the inclination angle of the circumferential wall 13 is a range of the processing limitation of the circumferential wall 13 having the inner circumferential surface 30 as the vertical wall, it is possible to form the projected section 11 having the circumferential wall 13 by pressing or the like.

(7)

In the body structure 20 of this embodiment, since the damping adhesive 10 is viscoelastic, it is possible to reliably increase the total amount of the strain energy by reliably generating the shearing strain and the compression strain and thus to reliably improve the vibration damping effect.

(8)

In the body structure 20 of this embodiment, the damping adhesive 10 has the loss factor of 0.2 or higher and the storage modulus of 100 MPa or higher under the conditions of 20° C. and 60 Hz. Due to this property, the damping adhesive 10 can exert the more significant vibration damping effect than the structural adhesive.

(9)

In the body structure 20 of this embodiment, the first body component is the joint member 9 having the flat surface section 9a, and the second body component is the side sill 7 as the hollow member that has the inner circumferential surface forming the space section 7c, in which the joint member 9 can be inserted. The portion between the flat surface section 9a and the inner peripheral surface of the space section 7c as the first bonded surface and the second bonded surface is filled with the damping adhesive 10 such that the damping adhesive 10 contacts the inner circumferential surface 30 of the recessed section 12 as the vertical wall. In this configuration, in the configuration that the flat surface section 9a of the joint member 9 and the inner circumferential surface of the side sill 7 are bonded via the damping adhesive 10, the flat surface section 9a is formed with the inner circumferential surface 30 as the vertical wall of the recessed section 12, and the portion between the flat surface section 9a and the inner circumferential surface of the side sill 7 is filled with the damping adhesive 10 such that the damping adhesive 10 contacts the inner circumferential surface 30. Accordingly, in the bonded portion between the joint member 9 and the side sill 7, it is possible to improve the vibration damping effect by the damping adhesive 10 while suppressing the increase in the application amount of the damping adhesive 10 and the shape change of the component.

Modified Embodiments (A)

In the above embodiment, the inner circumferential surface 30 as the vertical wall of the recessed section 12 is formed in the flat surface section 9a of the joint member 9. However, the present disclosure is not limited thereto. The vertical wall (for example, the inner circumferential surface of the recessed section) may be formed in the inner circumferential surface of the hollow member such as the side sill 7.

Alternatively, the vertical wall may be formed in each of the first bonded surface of the first body component (the flat surface section 9a of the joint member 9) and the second bonded surface of the second body component (the inner circumferential surface (such as the vertical surface 7d) of the side sill 7). Also, in these cases, since the vertical wall is provided in the flat surface section 9a and the inner circumferential surface (such as the vertical surface 7d) of the side sill 7, the compression strain is generated to the damping adhesive 10 (damping member) by the vertical wall. As a result, it is possible to increase the strain energy absorbed by the damping adhesive 10 and to improve the vibration damping effect.

In addition, in the configuration that the vertical wall is formed in each of the first bonded surface of the first body component and the second bonded surface of the second body component, even in the case where the vertical walls formed in the first bonded surface and the second bonded surface are arranged at positions that are mutually shifted in the in-plane direction, the above vibration damping effect can be exerted.

(B)

In the above embodiment, such an example has been described that the joint member 9 is applied as the first body component and the side sill 7 having the space section 7c is applied as the second body component. However, the present disclosure is not limited thereto. As long as the two adjacent body components in another portion of the body are made to overlap and bonded, the body structure of the present disclosure can also be applied to such a portion.

Figure 12A:
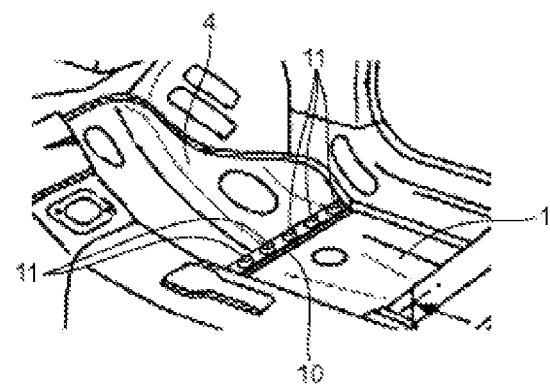
FIG. 12A is an enlarged perspective view of a cabin front portion, to which a body structure for a vehicle according to a modified embodiment of the present disclosure is applied, and an area near an overlapping portion between a floorboard and a toe board.
Figure 12B:
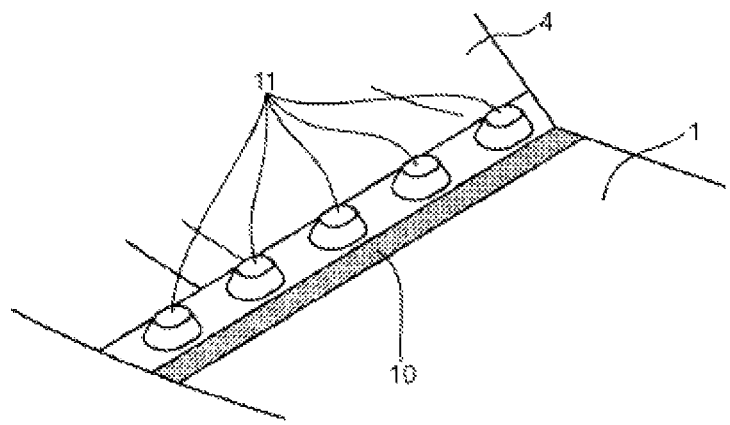
FIG. 12B is an enlarged view of the overlapping portion in FIG. 12A.

As a modified embodiment of the present disclosure, in a portion in which flat surfaces are made to overlap in the body, for example, as illustrated in FIG. 12A and FIG. 12B, in a portion in which overlapping portions between the floor panel 1 (first body component) and the toe board 4 (second body component) are bonded via the damping adhesive 10 (damping member), the projected section 11 provided with the vertical wall in FIGS. 3 to 4B (that is, the projected section 11 having the inner circumferential surface 30 of the recessed section 12 in FIG. 4) may be formed in the toe board 4 among the floor panel 1 and the toe board 4, for example.

Figure 13:
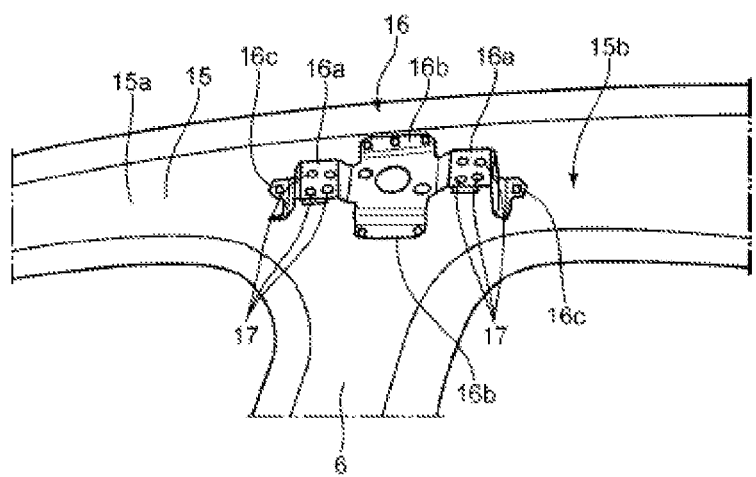
FIG. 13 is a view of a cabin upper portion to which a body structure for a vehicle according to another modified embodiment of the present disclosure is applied and is a view in which the joint member is arranged inside a roof rail.
Figure 14:
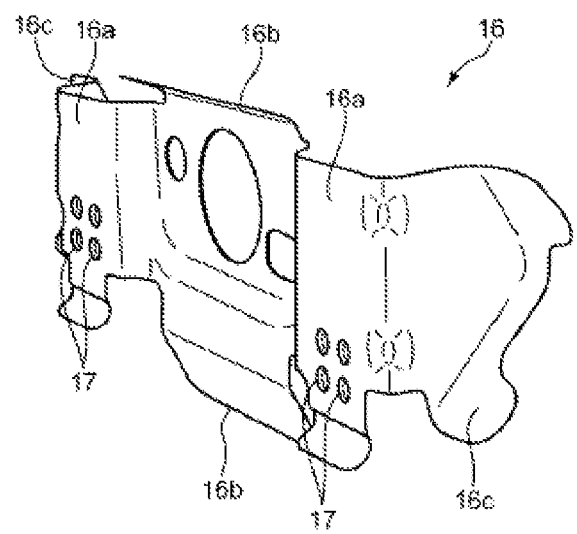
FIG. 14 is a perspective view of the joint member in FIG. 13.

In addition, as another modified embodiment of the present disclosure, as illustrated in FIGS. 13 to 14, in a configuration that a joint member 16 (second body component) is provided in the hollow roof rail 15 (first body component), a projected section 17 may be formed in a flat surface section 16a of the joint member 16, for example, of the roof rail 15 and the joint member 16. As illustrated in FIG. 13, the joint member 16 is inserted in a space section 15b of the roof rail 15. In such a state, flange sections 16b, 16c of the joint member 16 (see FIGS. 13 to 14) are fixed to an outer roof rail 15a of the roof rail 15 by welding or the like. The projected section 17 of the joint member 16 is a hollow portion that is projected from the flat surface section 16a to the outer roof rail 15a side. When overlapping surfaces of the flat surface section 16a and an inner roof rail, which is not illustrated, are bonded by the damping adhesive, a similar configuration to that in FIGS. 3 to 4 can be obtained.

The joint member 16 illustrated in FIGS. 13 to 14 have a flat shape by pressing a single metal sheet. However, the present disclosure is not limited thereto. A joint member in a box shape may be applied. Also, in such a case, the projected section having the vertical wall only needs to be formed in at least one surface of overlapping surfaces of the box-shaped joint member and the roof rail.

(C)

Figure 15A:
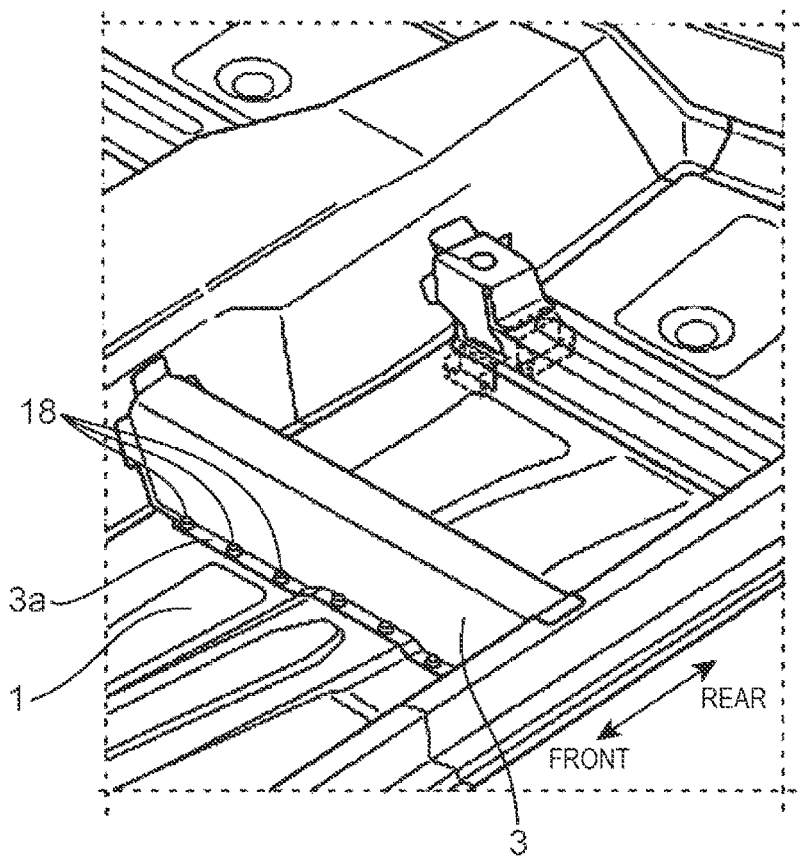
FIG. 15A is a view illustrating a cabin bottom portion to which a body structure for a vehicle according to further another modified embodiment of the present disclosure is applied.
Figure 15B:
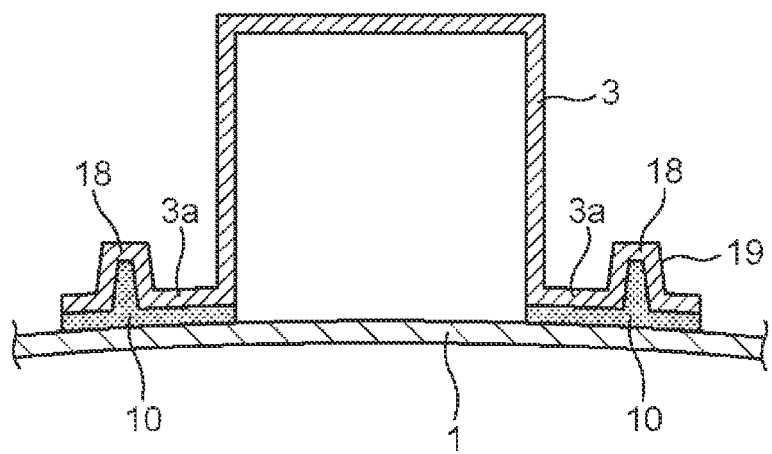
FIG. 15B is a cross-sectional view of an overlapping portion between a cross reinforcement member in a hat cross-sectional shape and the floor panel.

Furthermore, as further another modified embodiment of the present disclosure, as illustrated in FIG. 15A and FIG. 15B, in a configuration that overlapping surfaces of the cross reinforcement member 3 (first body component) having a hat cross-sectional shape and the floor panel 1 (second body component) are bonded via the damping adhesive 10 (damping member), a projected section 18 having a vertical wall may be formed in a brim section 3a as the first bonded surface of the cross reinforcement member 3. In this modified embodiment, in the configuration that the brim section 3a as the first bonded surface of the cross reinforcement member 3 (first body component) having the hat cross-sectional shape and a flat surface as the second bonded surface of the floor panel 1 (second body component) are made to overlap and bonded via the damping adhesive 10, the projected section 18 having a circumferential wall 19 as the vertical wall is formed in the brim section 3a. Accordingly, in a bonded portion of the cross reinforcement member 3 (first body component) having the hat cross-sectional shape, it is possible to improve the vibration damping effect by the damping adhesive 10 while suppressing the increase in the application amount of the damping adhesive 10 and the shape change of the component.

Similar to the modified embodiment in FIGS. 15A-B, a bonded portion between a member having a hat cross-sectional shape other than the cross reinforcement member 3 and the flat surface can also be applied.

In addition, even in the case where the vertical wall is formed in the flat surface as the second bonded surface of the floor panel 1 instead of being formed in the brim section 3a as the first bonded surface of the cross reinforcement member 3, the above operational effects can be exerted.

(D)

In the above embodiment and modified embodiments (A) to (C), the example in which the projected section having the vertical wall is formed in the first bonded surface of the first body component has been described. However, the present disclosure is not limited thereto. In the present disclosure, the first bonded surface of the first body component only needs to be formed with the vertical wall that extends in the direction approaching the second bonded surface or the direction separating from the second bonded surface.

Figure 16:
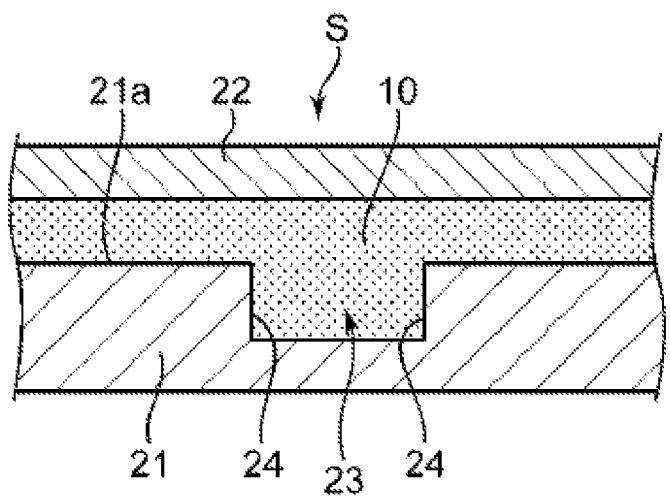
FIG. 16 is a cross-sectional explanatory view illustrating a configuration that, of an overlapping portion between a first component and a second component in a body structure for a vehicle according to further another modified embodiment of the present disclosure, a recessed section is formed in an inner surface of the first component, and an inner circumferential surface of the recessed section is a vertical wall.

Accordingly, as further another modified embodiment of the present disclosure, as illustrated in FIG. 16, in a configuration that overlapping surfaces S of a first body component 21 and a second body component 22 are bonded via the damping adhesive 10 (damping member), a recessed section 23 that is recessed in a direction separating from an opposing surface (second bonded surface) of the second body component may be formed in a first bonded surface 21a of the first body component 21, and the vertical wall is constructed of an inner circumferential surface 24 of the recessed section 23.

Also, in this case, the compression strain is generated to the damping adhesive 10 due to the compression of the damping adhesive 10, with which the recessed section 23 is filled, by the inner circumferential surface 24 as the vertical wall, and thus the total amount of the strain energy absorbed by the damping adhesive 10 can be increased. As a result, it is possible to improve the vibration damping effect by the damping adhesive 10 while suppressing the increase in the application amount of the damping adhesive 10 and the shape change of the component.

Instead of forming the recessed section 23 in the first bonded surface 21a of the first body component 21, a projected section that is projected toward the opposing surface (second bonded surface) of the second body component 22 may be formed in the first bonded surface 21a. Also, in this case, the compression strain is generated to the damping adhesive 10 due to the compression of the damping adhesive 10 by an outer circumferential surface as the vertical wall of the projected section, and the total amount of the strain energy absorbed by the damping adhesive 10 can be increased.

The embodiment will be summarized as follows.

The body structure for a vehicle according to the embodiment is the body structure for a vehicle that includes: the first body component having the first bonded surface; and the second body component having the second bonded surface opposing the first bonded surface, and in which the first bonded surface and the second bonded surface are bonded via the damping member, with which the portion between the first bonded surface and the second bonded surface is filled. The first bonded surface is formed with the vertical wall that extends in the direction approaching the second bonded surface or the direction separating from the second bonded surface. The portion between the first bonded surface and the second bonded surface is filled with the damping member such that the damping member contacts the vertical wall.

In such a configuration, when the first bonded surface of the first body component and the second bonded surface of the second body component are displaced relative to each other in the direction that intersects the normal direction of the first bonded surface (for example, the in-plane direction of the first bonded surface), not only the shearing strain is generated to the damping member by the relative displacement of the first bonded surface and the second bonded surface, but also the compression strain is simultaneously generated to the damping member due to the compression of the damping member by the vertical wall formed in the first bonded surface. In this way, the total amount of the strain energy absorbed by the damping member is increased. The damping member can dampen the vibration by converting this strain energy into the thermal energy. As a result, it is possible to improve the vibration damping effect by the damping member while suppressing the increase in the application amount of the damping member and the shape change of the component.

In the above body structure for a vehicle, preferably, the first bonded surface has the recessed section that is recessed in the direction separating from the second bonded surface, the vertical wall is constructed of the inner circumferential surface that continues in the circumferential direction of the recessed section, and the recessed section is filled with the damping member, which contacts the vertical wall.

With such a configuration, in the recessed section, since the damping member is compressed against each other along the inner circumferential surface as the vertical wall, the compression strain of the damping member can be increased, and thus the strain energy absorbed by the damping member can further be increased. As a result, the vibration damping effect can further be improved.

In the body structure for a vehicle, preferably, the first body component has the plate-shaped member, the surface of which on the one side serves as the first bonded surface, the plate-shaped member is formed with the projected section, the surface of which on the one side is recessed and the surface of which on the other side is projected, and thus the recessed section is formed in the first bonded surface by the projected section.

With such a configuration, the recessed section can easily be formed in the first bonded surface by pressing the plate-shaped member. In addition, it is also possible to form the vertical wall having the greater height than the thickness of the plate-shaped member, the strain energy by the compression strain, which is generated to the damping member by the vertical wall, can be improved, and the vibration damping effect can further be improved.

In the above body structure for a vehicle, preferably, the recessed section has the shape, the aspect ratio of which falls within the range of 0.5 to 2.0 when seen in the normal direction of the first bonded surface.

With such a configuration, since the shape of the recessed section is such a shape that the aspect ratio falls within the range of 0.5 to 2.0 when seen in the normal direction of the first bonded surface, that is, such a shape that the vertical and lateral lengths of the recessed section are substantially equal, it is possible to further increase the compression strain of the damping member while suppressing the deformation of the inner circumferential surface of the recessed section. In this way, the strain energy absorbed by the damping member can further be increased, and the vibration damping effect can further be improved.

In the above body structure for a vehicle, preferably, the recessed section has the circular shape when seen in the normal direction of the first bonded surface.

With such a configuration, since the vertical and lateral lengths of the recessed section are equal, the effect of increasing the compression strain of the damping member while suppressing the deformation of the inner circumferential surface of the recessed section becomes the highest.

In the above body structure for a vehicle, preferably, the vertical wall is preferably inclined at 16 to 100 degrees with respect to the first bonded surface.

With such a configuration, the further significant compression strain is generated to the damping member due to the significant compression of the damping member by the vertical wall. Accordingly, the total amount of the strain energy absorbed by the damping member is further increased, and the vibration damping effect can further be improved.

In the above body structure for a vehicle, preferably, the damping member is viscoelastic.

With such a configuration, since the damping member is viscoelastic, it is possible to reliably increase the total amount of the strain energy by reliably generating the shearing strain and the compression strain and thus to reliably improve the vibration damping effect.

In the above body structure for a vehicle, preferably, the damping member has the loss factor of 0.2 or higher and the storage modulus of 100 MPa or higher under the conditions of 20° C. and 60 Hz.

With such a configuration, due to this property, the damping member can exert the more significant vibration damping effect than the structural adhesive.

In the above body structure for a vehicle, preferably, one of the first body component and the second body component is the joint member having the flat surface section, the other of the first body component and the second body component is the hollow member having the inner circumferential surface formed with a space section in which the joint member can be inserted, and the portion between the flat surface section and the inner circumferential surface as the first bonded surface and the second bonded surface is filled with the damping member such that the damping member contacts the vertical wall.

With such a configuration, in the configuration that the flat surface section of the joint member and the inner circumferential surface of the hollow member are bonded via the damping member, any one of the flat surface section and the inner circumferential surface is formed with the vertical wall, and the portion between the flat surface section and the inner circumferential surface is filled with the damping member such that the damping member contacts the vertical wall. Thus, in the bonded portion between the joint member and the hollow member, it is possible to improve the vibration damping effect by the damping member while suppressing the increase in the application amount of the damping member and the shape change of the component.

In the above body structure for a vehicle, preferably, the first body component has the hat cross-sectional shape having the brim section as the first bonded surface, the second body component has the flat surface as the second bonded surface that is made to overlap the brim section via the damping member, and the vertical wall is formed in the brim section.

With such a configuration, in the configuration that the brim section of the first body component having the hat cross-sectional shape and the flat surface of the second body component are made to overlap and bonded via the damping member, the vertical wall is formed in the brim section. Accordingly, in the bonded portion of the first body component having the hat cross-sectional shape, it is possible to improve the vibration damping effect by the damping member while suppressing the increase in the application amount of the damping member and the shape change of the component.

As it has been described herein, according to the body structure for a vehicle in the embodiment, it is possible to improve the vibration damping effect by the damping member while suppressing the increase in the application amount of the damping member and the shape change of the component.

What is claimed is:

1. A body structure for a vehicle, the body structure comprising a first body component having a first bonded surface; and a second body component having a second bonded surface opposing the first bonded surface, wherein
the first bonded surface and the second bonded surface are bonded via a damping member with which a portion between the first bonded surface and the second bonded surface is filled,
the first bonded surface has a vertical wall that extends in a direction separating from the second bonded surface,
the portion between the first bonded surface and the second bonded surface is filled with the damping member such that the damping member contacts the vertical wall,
the first bonded surface has a recessed section that is recessed in the direction separating from the second bonded surface, the recessed section comprising a circumferential wall having a closed shape and a top wall that closes an opening edge of the circumferential wall and extends along the second bonded surface,
the vertical wall is an inner circumferential surface of the circumferential wall and continues in a circumferential direction of the recessed section, and
the recessed section is filled with the damping member, which contacts the vertical wall.

2. The body structure for a vehicle according to claim 1, wherein the first body component has a plate-shaped member, a surface of which on one side serves as the first bonded surface, and
the plate-shaped member has a projected section, a surface of which on the one side is recessed and a surface of which on another side is projected, and the recessed section is thereby formed in the first bonded surface by the projected section.

3. The body structure for a vehicle according to claim 1, wherein the recessed section has a shape, an aspect ratio of which falls within a range of 0.5 to 2.0 when seen in a normal direction of the first bonded surface.

4. The body structure for a vehicle according to claim 3, wherein the recessed section has a circular shape when seen in the normal direction of the first bonded surface.

5. The body structure for a vehicle according to claim 1, wherein the vertical wall is inclined at 16 to 100 degrees with respect to the first bonded surface.

6. The body structure for a vehicle according to claim 1, wherein the damping member is viscoelastic.

7. The body structure for a vehicle according to claim 1, wherein the damping member has a loss factor of 0.2 or higher and a storage modulus of 100 MPa or higher under conditions of 20° C. and 60 Hz.

8. The body structure for a vehicle according to claim 1, wherein one of the first body component and the second body component is a joint member having a flat surface section,
the other of the first body component and the second body component is a hollow member having an inner circumferential surface with a space section in which the joint member can be inserted, and
a portion between the flat surface section and the inner circumferential surface as the first bonded surface and the second bonded surface is filled with the damping member such that the damping member contacts the vertical wall.

9. The body structure for a vehicle according to claim 1, wherein the first body component has a hat cross-sectional shape having a brim section as the first bonded surface,
the second body component has a flat surface as the second bonded surface that is made to overlap the brim section via the damping member, and
the vertical wall is disposed in the brim section.

10. The body structure for a vehicle according to claim 2, wherein the recessed section has a shape, an aspect ratio of which falls within a range of 0.5 to 2.0 when seen in a normal direction of the first bonded surface.

* * * * *